United States Patent
Kühn et al.

[19]

[11] Patent Number: 5,953,221
[45] Date of Patent: Sep. 14, 1999

[54] CIRCUIT BREAKER OR CONTACT SYSTEM WITH A MULTI-RANGE POWER SUPPLY UNIT AND A MULTI-RANGE POWER SUPPLY UNIT

[75] Inventors: Torsten Kühn, Bad Honnef; Ralph Arnold, Bonn, both of Germany

[73] Assignee: Klöckner Moeller GmbH, Bonn, Germany

[21] Appl. No.: 08/956,517

[22] Filed: Oct. 23, 1997

[30] Foreign Application Priority Data

Oct. 25, 1996 [DE] Germany .............. 196 44 435

[51] Int. Cl.$^6$ .............. H02H 7/12; G05B 24/02; H01H 47/20
[52] U.S. Cl. .............. 363/53; 323/324; 307/129
[58] Field of Search .............. 363/53; 323/300, 323/324, 327; 307/125, 129, 140; 200/295, 296, 303

[56] References Cited

U.S. PATENT DOCUMENTS

| | | | |
|---|---|---|---|
| 3,978,388 | 8/1976 | de Vries | 363/45 |
| 4,126,793 | 11/1978 | De Vries | 307/129 |
| 4,802,055 | 1/1989 | Beckrman | 361/56 |
| 5,539,168 | 7/1996 | Linzenich | 200/303 |

FOREIGN PATENT DOCUMENTS

| | | |
|---|---|---|
| 0448908 | 10/1991 | European Pat. Off. . |
| 1271246 | 1/1969 | Germany . |
| 2052756 | 5/1972 | Germany . |
| 4408009 | 6/1995 | Germany . |
| 396194 | 1/1966 | Switzerland . |

*Primary Examiner*—Robert E. Nappi
*Assistant Examiner*—Rajnikant B. Patel
*Attorney, Agent, or Firm*—Nils H. Ljungman & Associates

[57] ABSTRACT

A multi-range power supply unit with an automatic switchover between ranges for different power supply voltages is disclosed for use with devices such as circuit breakers or contact systems. The power supply unit preferably has only two input connections for an input voltage range of approximately 20V–230V. Between the two input connections there is a rectifier circuit with a voltage stabilizing element, such as a Z-diode or equivalent device, connected in parallel. Connected in series to the rectifier circuit is a current divider. The current divider includes a capacitance and a thermistor. The thermistor preferably has a positive temperature coefficient (PTC). The power supply unit can be used for a power supply with DC voltage and for a power supply with AC voltage.

20 Claims, 3 Drawing Sheets

CIRCUIT BREAKER OR CONTACT SYSTEM WITH A MULTI-RANGE POWER SUPPLY UNIT AND A MULTI-RANGE POWER SUPPLY UNIT

BACKGROUND OF THE INVENTION

1. Field of the Invention

The present invention relates generally to a multi-range power supply unit or power pack for devices such as circuit breakers and contact systems. The multi-range power supply unit can have an automatic switching between ranges for different power supply voltages. The power supply unit has at least two input connections for a power supply voltage, two output connections for an output voltage and a rectifier circuit.

2. Background Information

Known power supply units include various types of direct current power supply units for connection to different power supply voltages.

German Patent No. 44 08 009 A1, describes a direct current power supply unit which consists of an input stage for filtering and rectifying the input voltage, a transformer stage for the DC/DC conversion of the input voltage, and at least one output stage for smoothing and generation of the desired output voltage. An energy storage mechanism is located between the transformer stage and the output stage. The energy storage mechanism thereby makes available an essentially constant intermediate voltage for the output stage.

European Patent No. 0 448 908 A1 also describes a method for the generation of a stable DC voltage and a stable DC voltage source. The DC voltage source consists essentially of an inductance. To the inductance a switching element or make-break unit, which switching element can be controlled, has been connected in series. This device generates an approximately constant DC average value by means of the controllable switching element and a current discriminator circuit.

Both of the embodiments described above have the disadvantage that they are relatively complex and expensive.

OBJECT OF THE INVENTION

The object of the present invention is to create a multi-range power supply unit, which on one hand has an extremely simple construction and can be used with a wide range of input voltages, and on the other hand can be used with different types of voltages, such as AC or DC voltages, and thereby provide a stable output voltage.

SUMMARY OF THE INVENTION

The present invention teaches that this object can be accomplished in accordance with at least one possible embodiment, by connecting, between the input connections of the power supply unit, a current divider or current balancer circuit. The current divider circuit may include a parallel connection of a capacitive resistance or reactance and a thermistor with a positive temperature coefficient (PTC). A rectifier circuit is connected in series with the current divider circuit. The multi-range power supply unit of the present invention creates a power supply unit which can be realized using simple and economical means. The multi-range power supply unit preferably can have an input voltage range of at least 20V–230V. Thermal problems no longer occur with this simple construction.

The present invention advantageously makes it possible to feed the entire range of input voltages to the multi-range power supply unit through only two input connections. In the lower voltage range of approximately 20V–60V, which voltage range is provided for DC and AC voltage, only the thermistor is active, because in this range the capacitive reactance, which capacitive reactance is preferably realized in the form of a capacitance, creates an infinitely large resistance or reactance. In the upper voltage range of approximately 110V–230V, which voltage range is provided only for AC voltage, the power supply current initially flows through both parts of the current divider, until in an extremely short time the PTC heats up and its resistance increases to the point where in practical terms, only the capacitance is still active. As a result of this realization taught by the present invention, the voltage or current divider is designed so that it is automatically correctly configured for the different voltage ranges. Additional advantages of the invention are described in greater detail below with reference to the accompanying drawings.

In other words, the multi-range power supply unit can operate for both a 20V–60V AC or DC voltage and a 110V–230V AC voltage. In the 20V–60V range the current will preferably flow through the thermistor because the capacitive reactance acts as a very high resistance. In the 110V–230V range, the current initially flows through both the thermistor and the capacitive reactance. After a short time however, the resistance of the thermistor becomes very large due to the heating up of the thermistor, thereby causing the current to flow essentially through only the capacitive reactance. Thus, because of the switching nature of the current divider, the multi-range power supply unit can handle a variety of different input voltages.

The above discussed embodiments of the present invention will be described further hereinbelow with reference to the accompanying figure. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

The present invention is explained in greater detail below, with reference to the embodiments illustrated in the accompanying drawings, wherein.

DESCRIPTION OF THE PREFERRED EMBODIMENTS

Figure 1:
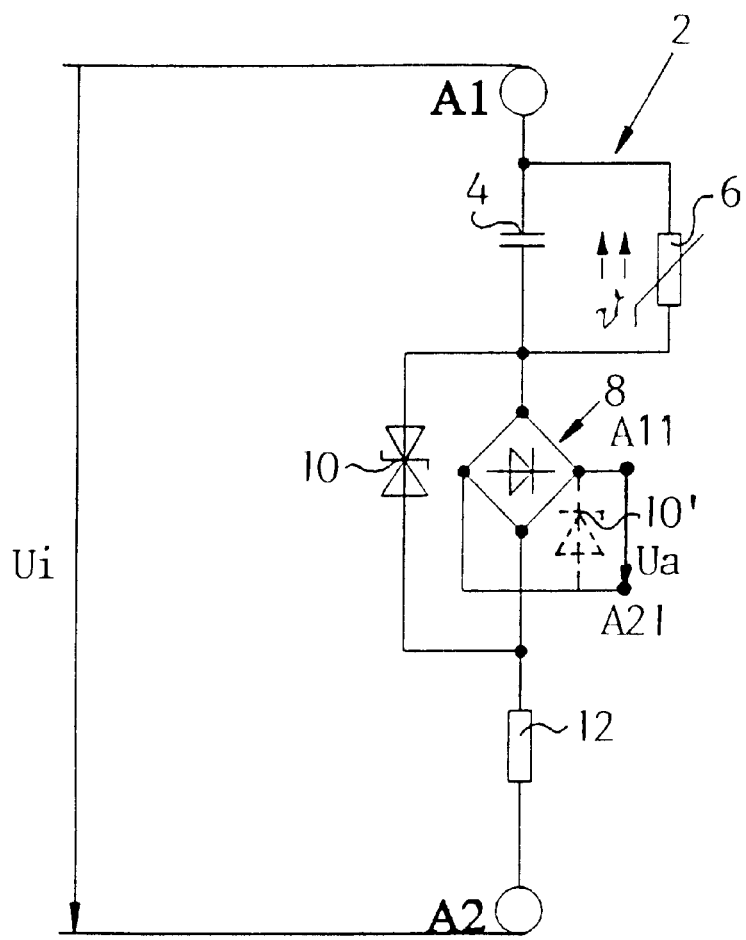
FIG. 1 shows a circuit drawing of a multi-range power supply unit.

In FIG. 1, the multi-range power supply unit of the present invention is illustrated in the form of one possible embodiment. The power supply unit of the present invention preferably has two input connections A1, A2. Through the input connections A1, A2, the power supply unit can be fed or supplied a broad range of input voltages. A power supply voltage Ui, preferably in the range of 20V–230V, can be connected to the input connections A1, A2. The present invention teaches that the switching between ranges for the different supply voltages Ui preferably occurs automatically. The entire voltage range is preferably covered in a lower voltage range which is suitable for the connection of the power supply unit either to a DC power supply or to an AC power supply, and in an upper voltage range which is suitable for connection to an AC power supply. The power supply unit of the present invention can be advantageously designed for a power supply range of approximately 20V–60V DC or AC, as well as an AC power supply range which extends from approximately 110V–230V.

Between the input connections A1, A2 there can be a current divider circuit 2. The present invention teaches that the current divider circuit 2 can include the parallel connection of a capacitive reactance 4 and a thermistor 6. The thermistor 6 preferably has a positive temperature coefficient. Connected in series with the current divider circuit 2 there can be a rectifier circuit 8. The rectifier circuit 8 can preferably be realized in the form of a double-way rectifier, full-wave rectifier or Graetz circuit. On the input side, the rectifier circuit 8 is preferably bridged or jumpered with a suppressor diode 10 or similar device. The suppressor diode 10 can preferably be used to stabilize the voltage. It is also conceivable, instead of the suppressor diode 10 located on the input side, to locate a Z-diode or Zener diode 10' or similar device on the output side. An ohmic resistance 12 is preferably connected to the series circuit, which series circuit includes the current divider circuit 2 and the rectifier circuit 8, with the Z-diode 10' or suppressor diode 10 connected in parallel.

The resistance 12 can have the effect of limiting the current. The power supply unit, on the output side of the rectifier circuit 8, can also have two output connections A11, A21 to output the desired stable output voltage Ua. To smooth the output voltage Ua, the present invention also teaches that the power supply unit can be provided on the output side with a filter or filter capacitance 100 (see FIG. 2).

Figure 2:
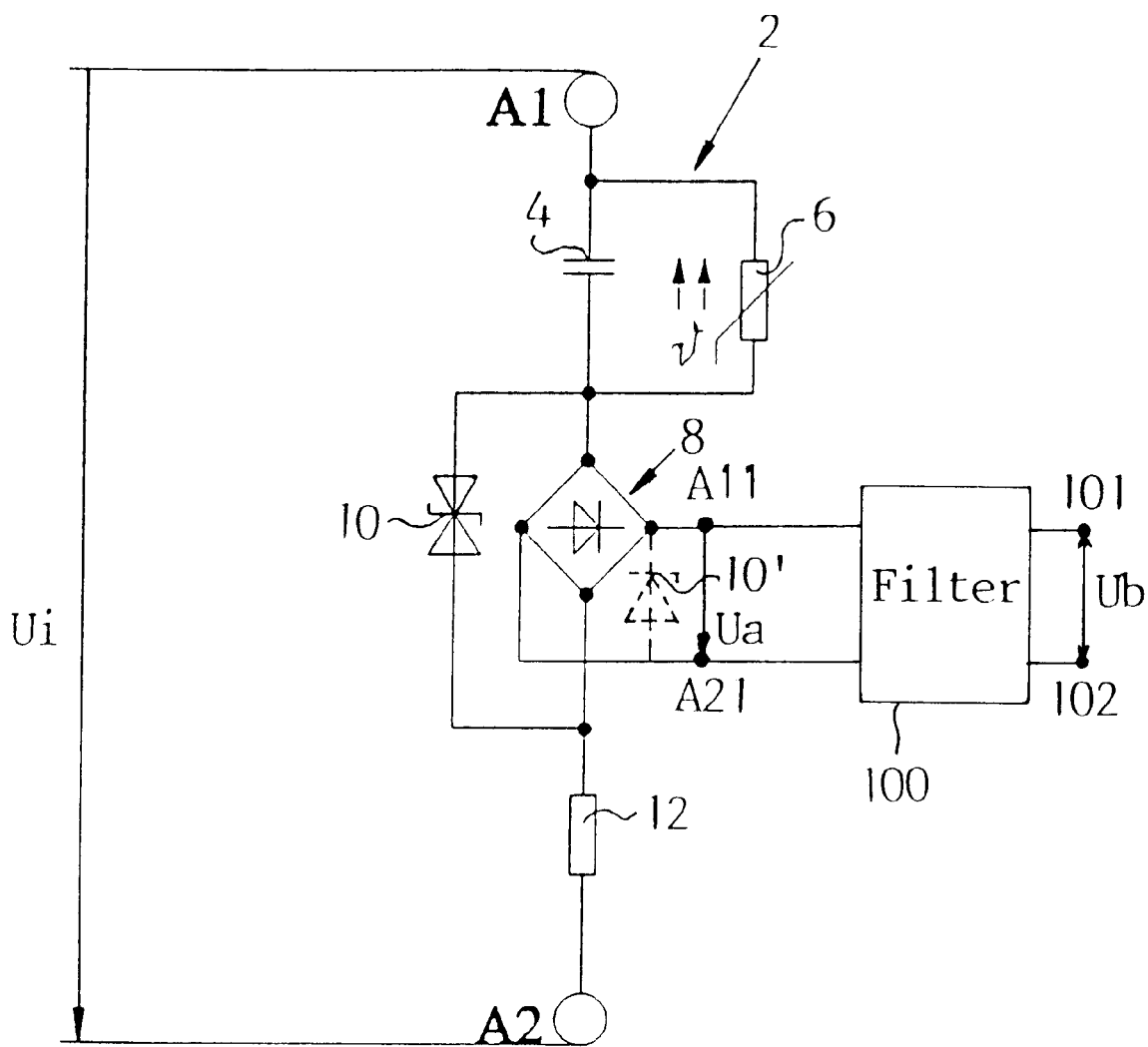
FIG. 2 shows additional features of the multi-range power supply unit of FIG. 1.

FIG. 2 shows another possible embodiment of the present invention where the filter 100 is connected to the output connections A11 and A21. The filter 100 is preferably designed to smooth out the output voltage Ua. The filter has output connections 101 and 102 to output a smooth and stable voltage Ub.

Figure 3:
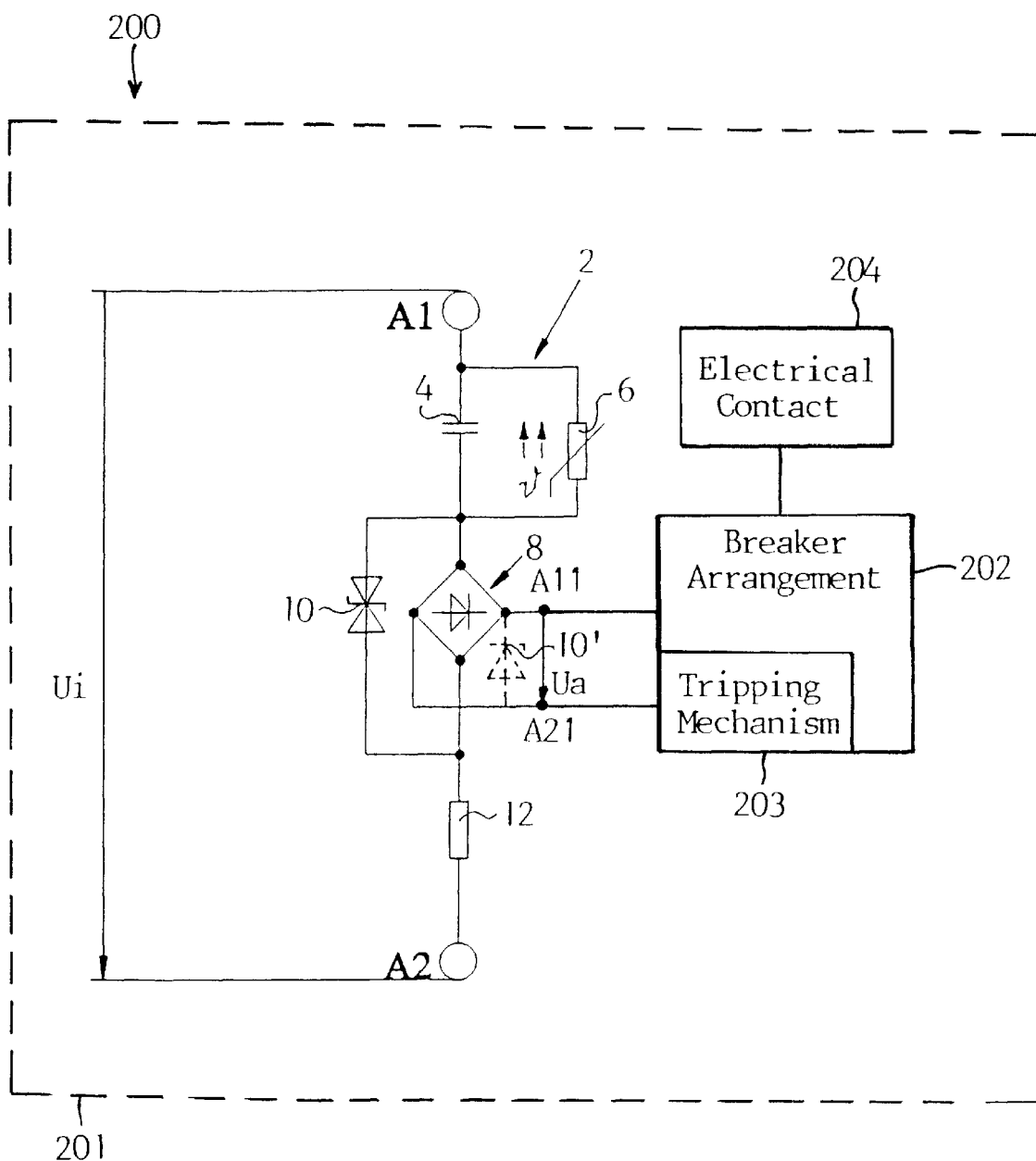
FIG. 3 shows the multi-range power supply unit used with a circuit breaker.

FIG. 3 shows another possible embodiment of the present invention wherein, the multi-range power supply unit can be used in conjunction with circuit breakers, contact systems, switches or overload relays 200. The circuit breaker 200 can include a housing 201. Inside the housing 201, a breaker arrangement 202 may be connected to the output connections A11 and A21. The breaker arrangement 202 can be connected and disconnected with electrical contacts 204 (shown as connected in FIG. 3). The breaker arrangement 202 can also include a tripping mechanism 203 to disconnect the breaker arrangement 202 from the electrical contact 204.

In another possible embodiment of the present invention the choice of the rectifier circuit 8, the capacitive reactance 4, the thermistor 6, the suppressor diode 10 or the Zener diode 10' can be used to set the output voltage Ua to a desired value. Furthermore, the switching action of the current divider 2, allows the multi-range power supply unit to be used in a wide variety of situations that have input voltages of differing sizes and types.

The present invention is not restricted to the embodiment illustrated in FIG. 1 as described above, but comprises all embodiments which work in the same manner as taught by the present invention.

One feature of the invention resides broadly in the multi-range power supply unit with an automatic switching between ranges for different power supply voltages Ui, which has at least two input connections A1, A2 for a power supply voltage Ui, two output voltages A11, A21 for an output voltage Ua, as well as one rectifier circuit 8, characterized by the fact that between the input connections A1, A2 of the power supply unit there is a current divider circuit 2 which includes a parallel connection of a capacitive reactance 4 and a thermistor 6 which has a positive temperature coefficient, and the rectifier circuit 8 is connected in series with the current divider circuit 2.

Another feature of the invention resides broadly in the multi-range power supply unit characterized by the fact that the rectifier circuit 8 is realized in the form of a double-way rectifier.

Yet another feature of the invention resides broadly in the multi-range power supply unit characterized by the fact that a suppressor diode 10 is connected in parallel to the input of the rectifier circuit 8.

Still another feature of the invention resides broadly in the multi-range power supply unit characterized by the fact that a Z-diode 10' is connected in parallel to the output of the rectifier circuit.

A further feature of the invention resides broadly in the multi-range power supply unit characterized by the fact that an ohmic resistance 12 is connected in series with the current divider circuit 2 and the rectifier circuit 8.

Another feature of the invention resides broadly in the multi-range power supply unit characterized by the fact that the output of the rectifier circuit 8 is equipped with a filter.

Yet another feature of the invention resides broadly in the multi-range power supply unit characterized by the fact that the multi-range power supply unit has two input connections A1, A2.

Examples of circuit breakers and contact systems which may possibly be utilized or adapted for use in the context of the present invention may be disclosed in the following U.S. Pat. No. 5,614,888 to Borchmann and Bungartz on Mar. 25, 1997; U.S. Pat. No. 5,543,595 to Mader and Arenz on Aug. 6, 1996; U.S. Pat. No. 5,539,168 to Linzenich on Jul. 23, 1996; U.S. Pat. No. 5,534,674 to Steffens on Jul. 9, 1996; U.S. Pat. No. 5,510,761 to Boder and Howald on Apr. 23, 1996; U.S. Pat. No. 5,483,212 to Lankuttis and Rossmann on Jan. 9, 1996; U.S. Pat. No. 5,452,172 to Lane and Snell on Sep. 19, 1995; U.S. Pat. No. 5,446,386 to Pollman, DellaVecchia, Goldman, Lewandoski and Rajotte on Aug. 29, 1995; U.S. Pat. No. 5,379,014 to Sato, Kurosawa, Suzuki, Hashimoto and Endoo on Jan. 3, 1995; U.S. Pat. No. 5,369,384 to Heins on Nov. 29, 1994; and U.S. Pat. No. 5,362,933 to Kutsch, Kremers, Baldewein, Hentschel and Voiss on Nov. 8, 1994.

Examples of full-wave rectifiers or Graetz circuits which may possibly be utilized or adapted for use in the context of the present invention may be disclosed in the following U.S. Pat. No. 5,641,914 to Doll on Jun. 24, 1997; U.S. Pat. No. 5,477,171 to Menegoli and Rohrbaugh on Dec. 19, 1995; U.S. Pat. No. 5,469,028 to Nilssen on Nov. 21, 1995; U.S. Pat. No. 5,450,521 to Redlich on Sep. 12, 1995; U.S. Pat. No. 5,436,822 to West on Jul. 25, 1995; U.S. Pat. No. 5,420,494 to Lu on May 30, 1995; U.S. Pat. No. 5,397,947 to Craft on Mar. 14, 1995; and U.S. Pat. No. 5,381,294 to Konishi on Jan. 10, 1995.

Examples of Z-diodes or Zener diodes which may possibly be utilized or adapted for use in the context of the present invention may be disclosed in the following U.S. Pat. No. 5,475,258 to Kato, Toyoda and Okabe on Dec. 12, 1995; U.S. Pat. No. 5,465,188 to Pryor and Challis on Nov. 7, 1995; U.S. Pat. No. 5,457,623 to Manor on Oct. 10, 1997; U.S. Pat. No. 5,440,115 to Bauco and Then on Aug. 8, 1995; U.S. Pat. No. 5,418,411 to Michel, Nelle, Mindl and Bireckoven on May 23, 1995; U.S. Pat. No. 5,410,177 to Harmel and Ryman on Apr. 25, 1995; and U.S. Pat. No. 4,703,248 to Kuhnemundt and Elsasser on Oct. 27, 1987.

Examples of rectifier circuits which may possibly be utilized or adapted for use in the context of the present invention may be disclosed in the following U.S. Pat. No. 5,457,622 to Arakawa on Oct. 10, 1995; U.S. Pat. No. 5,457,591 to Mock and Willis on Oct. 10, 1995; U.S. Pat. No. 5,446,295 to Whitney on Aug. 29, 1995; U.S. Pat. No. 5,420,777 to Muto on May 30, 1995; U.S. Pat. No. 5,406,470 to Ridley and Kern on Apr. 11, 1995; U.S. Pat. No. 5,400,235 to Carroll on Mar. 21, 1995, and U.S. Pat. No. 5,383,109 to Maksimovic and Erickson on Jan. 17, 1995.

Examples of current dividers which may possibly be utilized or adapted for use in the context of the present invention may be disclosed in the following U.S. Pat. No. 5,475,331 to Bult and Geelen on Dec. 12, 1995; U.S. Pat. No. 5,469,116 to Slemmer on Nov. 21, 1995; U.S. Pat. No. 5,459,430 to Ryat on Oct. 17, 1995; U.S. Pat. No. 5,448,491 to Janke and Rodrian on Sep. 5, 1995; and U.S. Pat. No. 5,381,102 to Schmidt on Jan. 10, 1995.

Examples of thermistors which may possibly be utilized or adapted for use in the context of the present invention may be disclosed in the following U.S. Pat. No. 5,477,417 to Ohmori and Kinjo on Dec. 19, 1995; U.S. Pat. No. 5,428,493 to Takeuchi and Nohara on Jun. 27, 1995; U.S. Pat. No. 5,428,206 to Uchida and Wakabayashi on Jun. 27, 1995; U.S. Pat. No. 5,425,099 to Takakura and Uchida on Jun. 13, 1995: U.S. Pat. No. 5,418,450 to Bacon on May 23, 1995; and U.S. Pat. No. 5,379,022 to Bacon and Farnsworth on Jan. 3, 1995.

Examples of suppressor diodes which may possibly be utilized or adapted for use in the context of the present invention may be disclosed in the following U.S. Pat. No. 5,600,545 to Simpkins on Feb. 4, 1997; U.S. Pat. No. 5,543,997 to Ruprecht on Aug. 6, 1996; U.S. Pat. No. 5,402,056 to Ketterling on Mar. 28, 1995; U.S. Pat. No. 5,245,412 to Clark and Dalsing on Sept. 14, 1993; U.S. Pat. No. 4,847,728 to Youla on Jul. 11, 1989; U.S. Pat. No. 4,802,055 to Beckerman on Jan. 31, 1989; and U.S. Pat. No. 4,563,720 to Clark on Jan. 7, 1986.

The components disclosed in the various publications, disclosed or incorporated by reference herein, may be used in the embodiments of the present inventions as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. 196 44 435.7, filed on Oct. 25, 1996, having inventors Torsten Kühn and Ralph Arnold, and DE-OS 196 44 435.7 and DE-PS 196 44 435.7, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof since modifications and variations thereof may be made without departing from the spirit and scope of the invention.

What is claimed is:

1. A power supply arrangement such as for a circuit breaker, contact system or switch, to accept a wide range of input voltage levels ranging from a low input voltage level to a high input voltage level and to provide a range of output voltage levels ranging from a low output voltage level to a high output voltage level and to provide a ratio of the high output voltage level to the low output voltage level being substantially smaller than a ratio of the high input voltage level to the low input voltage level, said power supply arrangement comprising:

at least two input connections to receive an input voltage;

at least one output connection to provide an output voltage;

a rectifier circuit;

a current divider circuit;

said current divider circuit and said rectifier circuit being electrically connected in series between said at least two input connections;

said current divider circuit comprising:

a thermistor having a positive temperature coefficient;

said positive temperature coefficient thermistor being configured to substantially increase in resistance upon an increase in temperature of said thermistor and to substantially decrease in resistance upon a decrease in temperature of said thermistor; and an arrangement to supply a capacitive reactance; and said capacitive arrangement and said thermistor are electrically connected in parallel to divide a flow of current between said capacitive arrangement and said thermistor.

2. The power supply arrangement according to claim 1, wherein said rectifier circuit comprises a full wave rectifier.

3. The power supply arrangement according to claim 2, comprising:

a device to supply an ohmic resistance; and said device to supply an ohmic resistance being electrically connected in series with said rectifier circuit and said current divider circuit.

4. The power supply arrangement according to claim 3, comprising:

one of a suppressor diode and a Zener diode; and said one of a suppressor diode and a Zener diode being electrically connected in parallel to said rectifier circuit.

5. The power supply arrangement according to claim 4, wherein:

said rectifier circuit comprises an input arrangement and an output arrangement;

said output arrangement of said rectifier circuit comprises a first output terminal and a second output terminal to output a voltage from said rectifier circuit;

said at least one output connection comprises said first output terminal and said second output terminal of said output arrangement of said rectifier circuit; and said at least two input connections comprise a first input terminal and a second input terminal.

6. The power supply arrangement according to claim 5, comprising:

a filter arrangement to filter the output voltage of said power supply arrangement; and said filter arrangement being electrically connected to said first output terminal and said second output terminal of said output arrangement of said rectifier circuit.

7. The power supply arrangement according to claim 6, wherein:

said one of a suppressor diode and a Zener diode comprises a suppressor diode; and said suppressor diode is electrically connected in parallel with said input arrangement of said rectifier circuit.

8. The power supply arrangement according to claim 6, wherein:

said one of a suppressor diode and a Zener diode comprises a Zener diode; and said Zener diode is electrically connected in parallel with said output arrangement of said rectifier circuit.

9. A power supply arrangement to accept a wide range of input voltage levels ranging from a low input voltage level to a high input voltage level and to provide a range of output voltage levels ranging from a low output voltage level to a high output voltage level and to provide a ratio of the high output voltage level to the low output voltage level being substantially smaller than a ratio of the high input voltage level to the low input voltage level, said power supply arrangement comprising:

at least two input connections to receive an input voltage;

at least one output connection to provide an output voltage;

a rectifier circuit;

said at least one output connection being connected to receive a voltage from said rectifier circuit;

a current divider circuit;

said current divider circuit and said rectifier circuit being serially electrically connected between said at least two input connections;

said current divider circuit comprising:

a thermistor having a positive temperature coefficient;

said positive temperature coefficient thermistor being configured to substantially increase in resistance upon an increase in temperature of said thermistor and to substantially decrease in resistance upon a decrease in temperature of said thermistor; and an arrangement to supply a capacitive reactance;

said capacitive arrangement and said thermistor being electrically connected to divide a flow of current between said capacitive arrangement and said thermistor;

said thermistor being configured to substantially increase resistance of said thermistor and impedance of said current divider circuit upon increase of said input voltage to provide the range of output voltage levels ranging from the low output voltage level to the high output voltage level to thus provide the ratio of the high output voltage level to the low output voltage level being substantially smaller than the ratio of the high input voltage level to the low input voltage level;

said capacitive arrangement comprising a capacitor to substantially increase impedance of said current divider circuit upon increase of said input voltage to provide the range of output voltage levels ranging from the low output voltage level to the high output voltage level to thus provide the ratio of the high output voltage level to the low output voltage level being substantially smaller than the ratio of the high input voltage level to the low input voltage level; and said thermistor and said capacitive arrangement being configured to substantially decrease impedance of said current divider circuit upon decrease of said input voltage to provide the range of output voltage levels ranging from the low output voltage level to the high output voltage level to thus provide the ratio of the high output voltage level to the low output voltage level being substantially smaller than the ratio of the high input voltage level to the low input voltage level.

10. The power supply arrangement according to claim 9, wherein said rectifier circuit comprises a full wave rectifier.

11. The power supply arrangement according to claim 10, comprising:

a device to supply an ohmic resistance; and said device to supply an ohmic resistance being electrically connected in series with said rectifier circuit and said current divider circuit.

12. The power supply arrangement according to claim 11, comprising:

one of a suppressor diode and a Zener diode; and said one of a suppressor diode and a Zener diode being electrically connected in parallel to said rectifier circuit.

13. The power supply arrangement according to claim 12, wherein:

said rectifier circuit comprises an input arrangement and an output arrangement;

said output arrangement of said rectifier circuit comprises a first output terminal and a second output terminal to output a voltage from said rectifier circuit;

said at least one output connection comprises said first output terminal and said second output terminal of said output arrangement of said rectifier circuit; and said at least two input connections comprise a first input terminal and a second input terminal.

14. The power supply arrangement according to claim 13, comprising:

a filter arrangement to filter the output voltage of said power supply arrangement; and said filter arrangement being electrically connected to said first output terminal and said second output terminal of said output arrangement of said rectifier circuit.

15. The power supply arrangement according to claim 14, wherein:

said one of a suppressor diode and a Zener diode comprises said suppressor diode; and said suppressor diode is electrically connected in parallel with said input arrangement of said rectifier circuit.

16. The power supply arrangement according to claim 14, wherein:

said one of a suppressor diode and a Zener diode comprises said Zener diode; and said Zener diode is electrically connected in parallel with said output arrangement of said rectifier circuit.

17. A circuit breaker, said circuit breaker comprising:

a housing;

at least one electrical contact;

said at least one electrical contact being disposed within said housing;

a breaker arrangement to connect and disconnect with said at least one electrical contact;

said breaker arrangement being disposed within said housing;

said breaker arrangement comprising a tripping mechanism to disconnect said breaker arrangement from said at least one electrical contact;

said tripping mechanism being disposed within said housing;

a power supply arrangement to provide a voltage to said breaker arrangement, and to accept a wide range of input voltage levels ranging from a low input voltage level to a high input voltage level and to provide a range of output voltage levels ranging from a low output voltage level to a high output voltage level and to provide a ratio of the high output voltage level to the low output voltage level being substantially smaller than a ratio of the high input voltage level to the low input voltage level; and said power supply arrangement comprising:

at least two input connections to receive an input voltage;

at least one output connection to provide an output voltage;

a rectifier circuit;

a current divider circuit;

said current divider circuit and said rectifier circuit being electrically connected in series between said at least two input connections; and said current divider circuit comprising:

a thermistor having a positive temperature coefficient;

said positive temperature coefficient thermistor being configured to substantially increase in resistance upon an increase in temperature of said thermistor and to substantially decrease in resistance upon a decrease in temperature of said thermistor; and an arrangement to supply a capacitive reactance; and said capacitive arrangement and said thermistor being electrically connected in parallel to divide a flow of current between said capacitive arrangement and said thermistor.

18. The circuit breaker according to claim 17, wherein:

said rectifier circuit comprises a full wave rectifier;

said power supply arrangement comprises one of a suppressor diode and a Zener diode;

said one of a suppressor diode and a Zener diode is electrically connected in parallel with said rectifier circuit;

said power supply arrangement comprises a device to supply an ohmic resistance;

said device to supply an ohmic resistance is electrically connected in series with said rectifier circuit and said current divider circuit;

said rectifier circuit comprises an input arrangement and an output arrangement;

said output arrangement of said rectifier circuit comprises a first output terminal and a second output terminal to provide an output voltage from said rectifier circuit;

said at least one output connection of said power supply arrangement comprises said first output; terminal and said second output terminal of said output arrangement of said rectifier circuit;

said at least two input connections of said power supply arrangement comprise a first input terminal and a second input terminal;

said power supply arrangement comprises a filter arrangement to filter the output voltage of said power supply arrangement; and said filter arrangement is electrically connected to said first output terminal and said second output terminal of said output arrangement of said rectifier circuit.

19. The circuit breaker according to claim 18, wherein:

said one of a suppressor diode and a Zener diode comprises a suppressor diode; and said suppressor diode is electrically connected in parallel with said input arrangement of said rectifier circuit.

20. The circuit breaker according to claim 18, wherein:

said one of a suppressor diode and a Zener diode comprises a Zener diode; and said Zener diode is electrically connected in parallel with said output arrangement of said rectifier circuit.

* * * * *